United States Patent [19]

Sturgeon

[11] 4,347,559
[45] Aug. 31, 1982

[54] SWITCHING POWER SUPPLY

[75] Inventor: Clayton L. Sturgeon, Johnson City, Tenn.

[73] Assignee: Texas Instruments Incorporated, Dallas, Tex.

[21] Appl. No.: 239,856

[22] Filed: Mar. 2, 1981

[51] Int. Cl.³ .......................................... H02M 3/335
[52] U.S. Cl. ..................................................... 363/21
[58] Field of Search ............................. 363/20, 21, 97

[56] References Cited

U.S. PATENT DOCUMENTS

| | | | |
|---|---|---|---|
| 3,909,696 | 9/1975 | Katov et al. | 363/21 |
| 4,028,606 | 6/1977 | Beuchee et al. | 363/20 |
| 4,276,586 | 6/1981 | Boekhorst | 363/21 |

*Primary Examiner*—William M. Shoop
*Attorney, Agent, or Firm*—James P. McAndrews; John A. Haug; Melvin Sharp

[57] ABSTRACT

A switching power supply has a power switching transistor furnishing a series of shaped pulses to output means for providing an output voltage, has control means including a voltage controlled oscillator responsive to the output voltage for providing control pulses whose frequency is representative of the output voltage level, and has saturable transformer means coupling the control pulses to the switching transistor for driving the transistor to regulate the output voltage within a selected range. First winding means on the saturable transformer drive the transformer to saturation with each control pulse and other winding means forward bias the switching transistor to conduct while the transformer is being driven to saturation and thereafter reverse bias the transistor to rapidly turn it off as the transformer recovers from saturation. The power supply includes means for varying transistor switching frequency and pulse width for regulating output voltage.

12 Claims, 4 Drawing Figures

SWITCHING POWER SUPPLY

BACKGROUND OF THE INVENTION

The invention relates to switching types of power supplies especially flyback and forward converters and the invention relates more particularly to switching power supplies for use with LSI equipments such as microprocessor-based process controllers and the like.

Switching power supplies have become increasingly popular with use with LSI equipments and the like because of size, weight and cost considerations. However, some difficulty has been experienced with switching power supplies in regulating the output voltage against both line and load changes. They have also tended to require greater care in matching the power supply characteristics to the requirements of the equipments.

It is an object of this invention to provide novel and improved switching power supplies which are simple, inexpensive, highly reliable, and which require very little energy to operate. It is a further object to provide such power supplies which are adapted for operation over a wide range of voltage, output and load.

SUMMARY OF THE INVENTION

Briefly described, the switching power supply of this invention includes input rectifying and filter means for furnishing a d.c. input. A power switching transistor is then operable to modify the d.c. input to provide a series of shaped pulses. A power transformer provides isolation and voltage level variation in accordance with the turns ratio of the transformer, and output rectifying and filter means receive the shaped pulses to provide an output voltage. Control means respond to the output voltage to provide control pulses whose frequency is representative of the output voltage level and driving means for the switching power transistor respond to the controlled pulses to vary the frequency or width of the shaped pulses provided by the switching transistor to regulate the output voltage to be within a selected range.

In accordance with this invention, the control means include means providing a reference voltage and means comparing the output voltage to the reference voltage to provide an error signal. Voltage controlled oscillator means respond to the error signal to provide a sequence of control pulses to a control transistor at a frequency corresponding to the level of the error signal. Saturable transformer means respond to the oscillator pulses for providing driving pulses to drive the power switching transistor. In preferred embodiments of the invention, the saturable transformer includes first winding means which are magnetically coupled to other winding means, the first winding means being responsive to the control pulses to apply driving pulses to the power transistor. The saturable transformer is arranged to be driven to saturation and to recover in response to the application of each control pulse. The other winding means are connected to the base and emitter means of the power switching transistor to forward bias and render the switching transistor conductive while the saturable transformer means is being driven to saturation and thereafter to reverse bias and render the power switching transistor rapidly nonconductive while the saturable transformer recovers, thereby to vary the frequency of the shaped pulses provided by the power transistor. In one preferred embodiment of the invention, the voltage applied to the power transistor base is clamped to a selected level to determine the width of the shaped pulse provided by the switching transistor and in another preferred embodiment, means respond to an additional winding on the saturable transformer for varying the clamped voltage in accordance with switching frequency, thereby to vary the pulse width for cooperating with variation in pulse frequency to regulate output voltage.

DESCRIPTION OF THE DRAWINGS

Other objects, advantages and details of the novel and improved switching power supplies of this invention appear in the following detailed description of preferred embodiments of the invention, the detailed description referring to the drawings in which.

DESCRIPTION OF THE PREFERRED EMBODIMENTS

Figure 1:
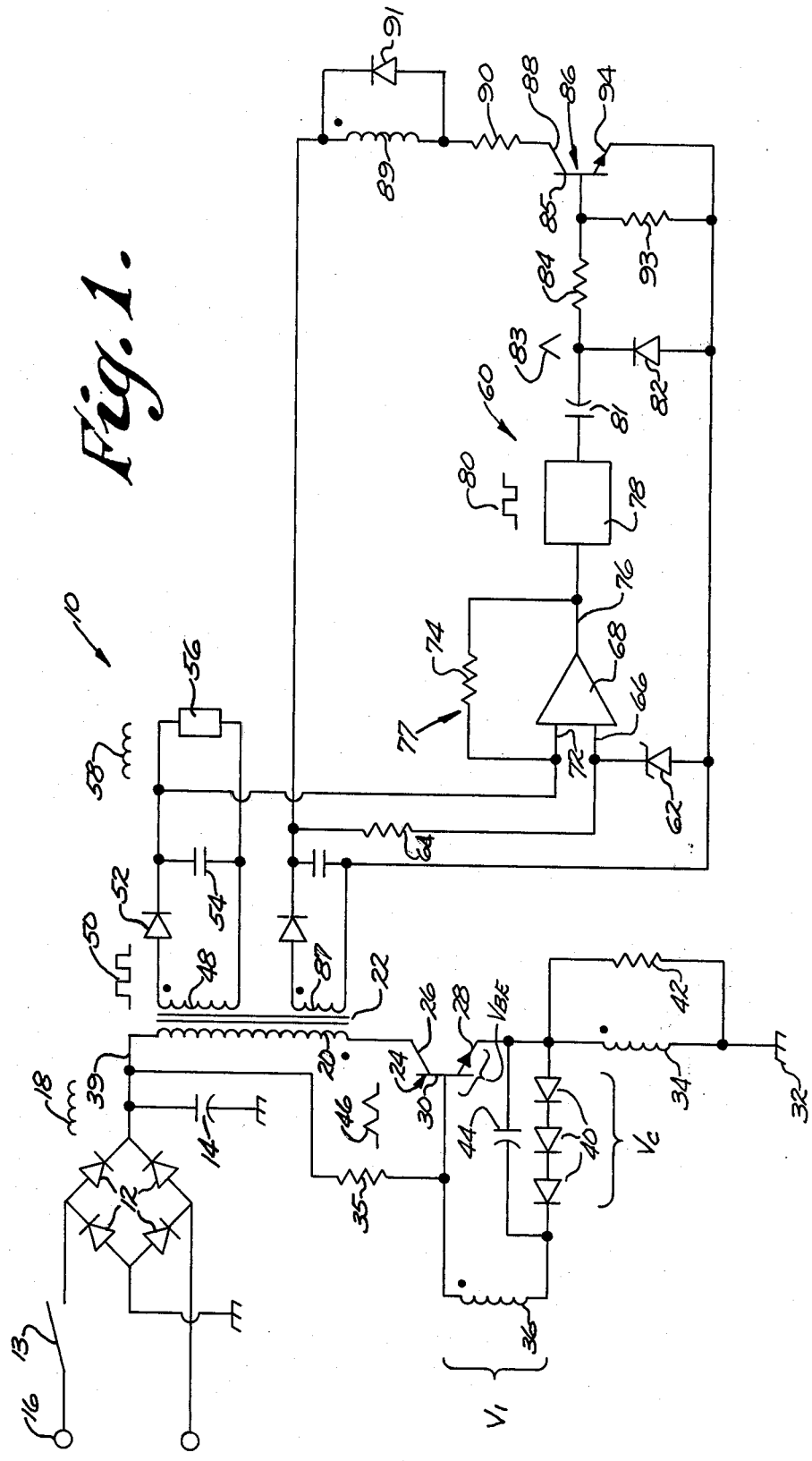
FIG. 1 is a schematic view illustrating one preferred embodiment of the switching power supply provided by this invention.

Briefly described, a preferred embodiment of the switching power supply of this invention indicated at 10 in FIG. 1 is shown to include input rectifying means 12 and filter means 14 which are connected through a manually operable switch 13 or the like to a conventional 120 VAC line or the like as in diagrammatically illustrated at 16 in FIG. 1. The input rectifying and filter menas provide a d.c. input (with a relatively small ripple as indicated at 18 in FIG. 1) to the primary 20 of a power or load transformer 22. A power switching transistor 24 has its collector 26 connected to the primary 20 and, in accordance with this invention, the emitter means 28 of the transistor is connected to ground 32 through windings34 respectively. A limiting resistor 42 is connected across the coil 34. A large resistor 35 is connected between the d.c. line 39 and the transistor base 30 for initially passing a trickle current to forward bias the transistor as described below. The diodes 40 are connected in series with the winding 36, between the base 30 and emitter 28 and the capacitor 44 is connected across the diodes to the transistor emitter 28 for purposes which will be hereinafter described. As will be understood, the power switching transistor 24 is adapted to be turned on and off to apply shaped pulses to the transformer primay 20 as is schematically illustrated at 46 in FIG. 1.

The secondary 48 of the load transformer is arranged to modulate the shaped pulses 46 provided by the switching transistor to adjust the voltage level thereof as indicated at 50 in FIG. 1. The polarity of the secondary 48 is indicated in FIG. 1 illustrating adaptation of the power supply 10 for flyback convertor application. Conventional rectifying means 52 and filter means 54 included with the transformer 22 constitute the output means 55 of the supply 10 and serve to integrate the pulses 50 to apply a d.c. output voltage to the load 56 with a high frequency ripple as indicated at 58 in FIG. 1.

A control means 60 responds to the output voltage 58 for providing a series of control pulses whose frequency is representative of the level of the voltage 58. In accordance with this invention, those control means include zener diode means 62 or the like connected between output ground and the positive input terminal 66 of an operational amplifier 68 to provide a reference voltage level at that positive terminal.

The positive terminal is also connected to the output voltage line 70 through gain-setting resistor 64 as indicated at 71. The negative terminal 72 of the amplifier is connected to the output voltage line 70 and, with the limiting resistor 74 connected from the negative terminal to the output terminal 76 of the amplifier, serves as a comparator 77 to provide an error signal representative of the difference between the reference voltage established at the terminal 66 and the output voltage applied to the load 56.

In accordance with this invention, a voltage controlled oscillator 78 (VCO) of any conventional type is arranged to respond to the error signal provided by the comparator 77 to provide a series of control pulses having a frequency representative of the error signal as is schematically indicated at 80 in FIG. 1. The oscillator pulses are coupled through the capacitor 81 to a diode 82 which differentiates the pulse wave form as indicated at 83 in FIG. 1 and applied that pulse through a limiting resistor 84 to the base 85 of a control transistor 86. As shown, an additional secondary winding 87 on the power transformer 22 having rectifier 87.1 and filter means 87.2 associated therewith provides an auxiliary voltage to the collector 88 of the control transistor 86 through an additional winding 89 and a limiting resistor 90 for a purpose to be hereinafter described. In addition, diode means 91 are connected across the windings 89 for limiting windings voltage. The control transistor base 92 is connected to output ground through a limiting resistor 93 and the control emitter 94 is also grounded as indicated in FIG. 1. In that arrangement, the control transistor 86 is rendered alternately conductive and non-conductive in response to the application of differentiated control pulses as provided by the voltage controlled oscillator, thereby to sequentially energize winding 89 as will be understood.

In accordance with this invention, the windings 34, 36 and 89 are wound on a common ferrite core or the like (no shown), the windings and core being selected and wound with polarities as indicated in FIG. 1 to constitute a saturable transformer (hereinafter referenced as saturable transformer 95).

In operation of the switching power supply 10 as above described, the voltage controlled oscillator 78 applies differentiated pulses to the control transistor 86 when the switch 13 is closed for sequentially energizing the coil 89 and when the resistor 35 initially passes a tuckle current to the transistor 24 to render it briefly conductive. The winding 89 is magnetically coupled to the winding 34 and 36 which accordingly forward bias the base-emitter junction of the power switching transistor 24 for rendering the power transistor conductive. Positive feedback from the winding 36 to winding 34 latches the power transistor in on condition with proportional drive of the base 30 until the saturable transformer 95 saturates. When the transformer 95 saturates, the voltage $V_c$ (see FIG. 1) rapidly removes the excess minority carriers through the base junction of the power transistor. When all minority carriers are removed, the transistor begins collector current fall-time. That takes place while the voltages across the windings 34, 36 and 89 reverse polarity. The energy stored in the core of the saturable transformer 95 then provides a reverse bias, base-to-emitter, in the power transistor 24 as the power transistor 24 is turned off, this reverse bias being maintained thereafter until the control transistor 86 again pulses saturable transformer 95 so that transistor 24 is turned on.

In this arrangement, the time required for turning off the power transistor 24 is determined by the clamped voltage $V_1$ (see FIG. 1) across the coil 36, by the nature of the core of the saturable transformer 95, and by the number of turns in the coil winding 89. In accordance with this invention, these factors are selected so that the shaped pulses 46 provided by the power transistor switch have a desired wave form as will be understood. Preferably, for example, the core of the saturable transformer 95 is selected to have a soft magnetic material having a narrow B-H hysteresis curve which allows for a variable forced beta in transistor 24 as described below. In that arrangement, the frequency of the shaped pulses 46 is thereby varied in accordance with the error signal provided by the comparator 77. The greater the error signal, the faster the voltage controlled oscillator runs and the power transistor is accordingly turned on at a higher frequency. Where the power supply 10 is adapted for flyback conversion as illustrated, pulses of energy are transferred to the secondary 48 each time the power transistor 24 is turned off. The energy of each pulse equals one half $LI_p^2$ and the power transferred to the secondary equals (one half $LI_p^2$) f, where f is the switching frequency L is the inductance of the primary 20, and $I_p$ is the peak current of the primary 20 at turnoff of the power transistor 24. The only interaction between the primay 20 and the secondary 48 is at the VCO frequency. Uniform pulses of equal energy are transmitted to the secondary 48. Accordingly, the output voltage of the supply 10 is regulated to be within a selected range.

Figure 4:
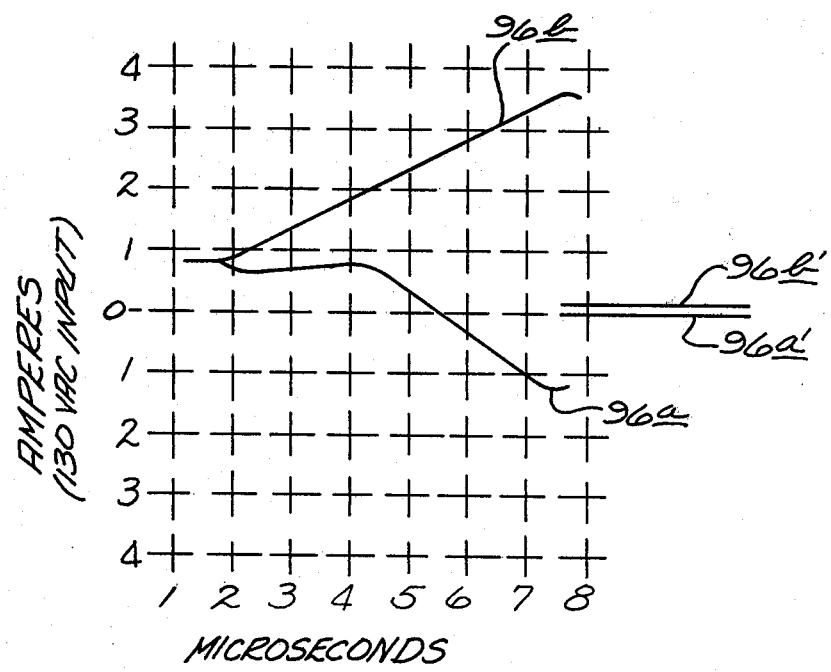
FIG. 4 is a graph illustrating switching characteristics of the power switching transistor as used in the power supplies provided by this invention.

In that arrangement of the supply 10 as above described, the energy required to drive the switching transistor 24 is low. The trigger pulse necessary for operating the switching transistor is typically in the milliwatt range. Further, the energy used in turning the power switching transistor on is stored in the core of the saturable transformer and is used in turning the power transistor off. Very few components are required in the supply 10 so that it is characterized both by low cost and high reliability. The base drive for the power switching transistor is self-generated at low voltages. The result is an increase in efficiency. Further, the forced beta varies as the base current 96a (see FIG. 4) varies and ranges from 3 to infinity to −3. This characteristic is advantageous in serving to turn the power transistor collector current off with greater speed as is illustrated by curve 96b in FIG. 4.

It is noted that, in the supply 10 as shown in FIG. 1, the voltage of the winding 34 is clamped to a voltage level equal to $V_c$ (as shown in FIG. 1) plus the base-to-emitter voltage $V_{BE}$ (see FIG. 1) of the power transistor 24. When the saturable transformer 95 reaches saturation, there is essentially no voltage across any of the windings 34, 36 or 89. The capacitor 44 then sweeps minority carriers from the base 30 of the power transistor which reduces storage time. The instant storage time is over, collector current fall-time is in progress.

The flux in the core of the saturable transformer 95 rapidly decreases during this time until the core is no longer saturated. At the same time, the voltage in the windings 34, 36 and 89 reverses polarity dissipating the energy stored in the core of the transformer 95. That energy is dissipated gradually so that it maintains the noted reverse base-to-emitter bias nearly constant until the power transistor is turned on in a repeat of the switching sequence.

In this regard, it is noted that if the voltage $V_c$ is made larger, the voltage level at which coil 34 is clamped will be larger and accordingly the saturable transformer 95 will reach saturation sooner. Accordingly, turn off of the power transistor 24 occurs sooner resulting in reduced width of the shaped pulses 46 provided by the transistor 24. Conversely, if the voltage $V_c$ is decreased, the coil 34 is clamped at a lower voltage level and turn off of the transistor 24 occurs later resulting in a wider pulse width 46.

Figure 2:
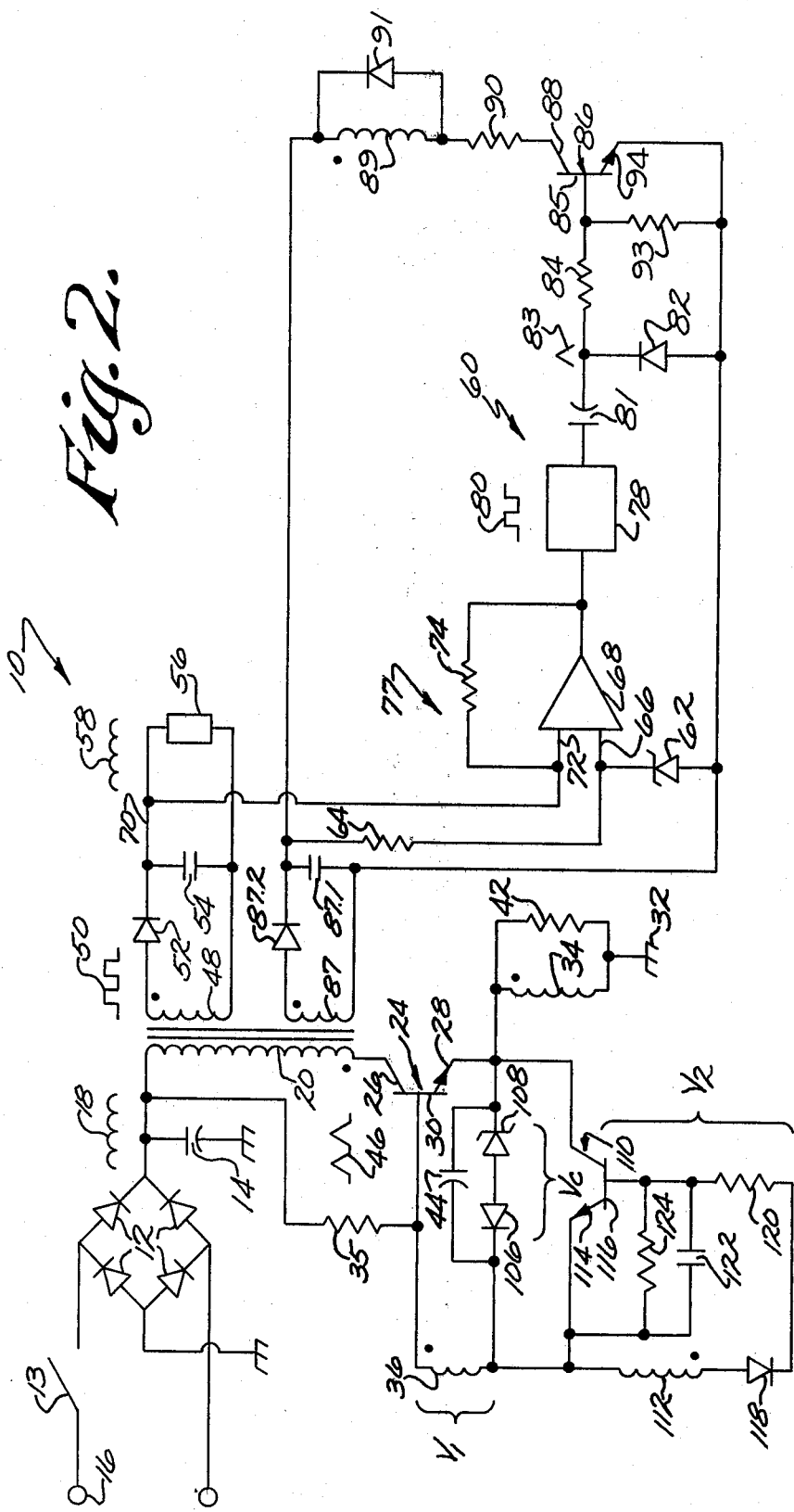
FIG. 2 is a schematic view illustrating another preferred embodiment of the switching power supply of this invention.
Figure 3:
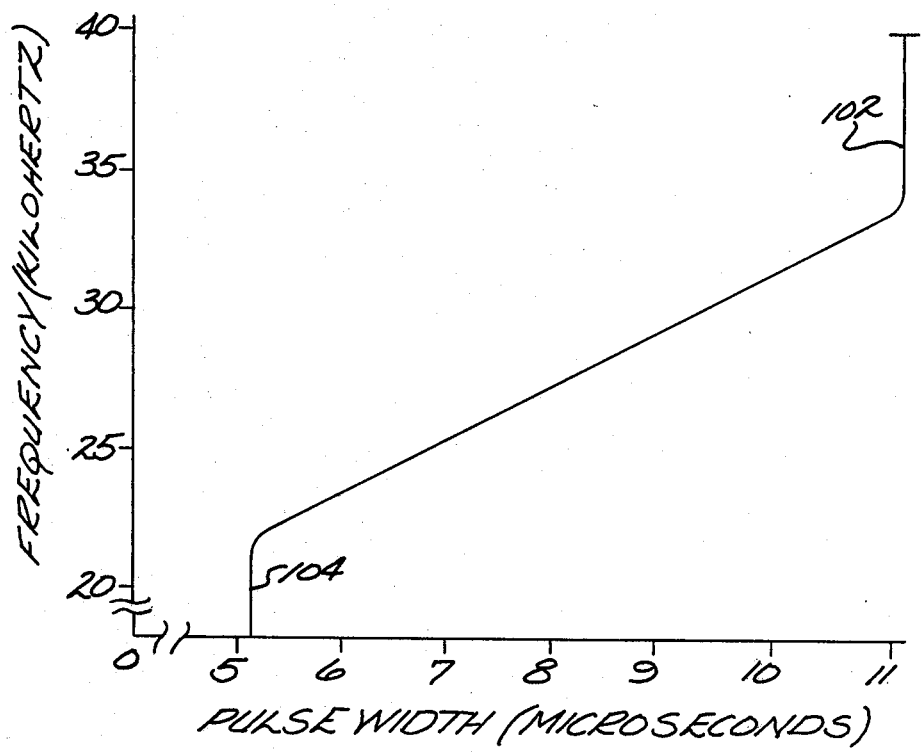
FIG. 3 is a graph illustrating characteristics of the power supply schematically illustrated in FIG. 2.

In another preferred embodiment of the power supply of this invention as indicated at 100 in FIG. 2, means are included for varying the voltage at which the coil 34 is clamped to at least a selected extent, the variation being in accordance with change in the switching frequency of the transistor 24. In that arrangement, the supply is adapted to detect an increase or decrease in control pulse frequency and to alter the $V_c$ such that the shaped pulses 46 provided by the transistor 24 have greater width and accordingly less change in power transistor switching frequency is required to regulate the output voltage level of the supply. When the maximum pulse width is reached as indicated at 102 in FIG. 3, the switching frequency is increased to provide the power required and when the minimum pulse width is reached as indicated at 104 in FIG. 3, the frequency of the pulses is decreased.

Thus, as is shown in FIG. 2, the power supply 100 generally includes the components as described above with reference to FIG. 1, corresponding components being identified with corresponding reference numerals as will be understood. In embodiment 100 of this invention as illustrated in FIG. 2, the diodes 42 are replaced by a single diode 106 and a zener diode 108 as shown in FIG. 2. An additional control transistor 110 is connected across the capacitor 44 as shown; a winding 112 is connected from the emitter 114 to the base 116 of the transistor 110 through a diode 118 and a limiting resistor 120 as shown in FIG. 2. Filter means 122 and 124 are also preferably connected between the emitter and base as shown.

In accordance with this invention, the winding 112 comprises a fourth winding which is provided on the core of the saturable transformer 95 and which is therefore magnetically coupled to the winding 89. In that arrangement, the voltage $V_2$ applied to the base of the transistor 110 is a function of the switching frequency of the control transistor 86 and varies directly with that switching frequency. If that switching frequency is high, the voltage $V_2$ is high and the current shunted through the control transistor 110 is increased, thereby reducing the current available for charging capacitor 44. Accordingly, voltage $V_c$ across the capacitor 44 decreases causing the width of the shaped pulses 46 to increase such that the switching frequency of the power transistor 24 need not increase to a high level. Conversely, if the switching frequency of the control transistor 86 is low, it causes the voltage $V_1$ to increase and the width of the pulses 46 to decrease such that the switching frequency of the power transistor 24 need not decrease to a variable level. In that way, the power supply 100 is adapted to operate over a wider range of load and line voltages without excessive frequency variation until maximum or minimum pulse width occurs. It also permits the supply to operate with a smaller power or load transformer while delivering the same amount of power.

In typical examples of a power supplies 10 and 100 as above described, the following components are incorporated:

| COMPONENT REFERENCE | DESIGNATION |
| --- | --- |
| transistor 24 | TIP551 |
| transistor 86 | 2N2222 |
| transistor 110 | TIP 120 |
| VCO 78 | RCA CMOS 4046 |
| op-amp 68 | 224 Quad. |
| diode 40 | IN4002 |
| diode 52 | 12A-Dual Schottky |
| diode 82 | IN4148 |
| diode 87 | IN4936 |
| diode 118 | IN4002 |
| zener 62 | IN4568 |
| zener 108 | 3.3 volt |
| capacitor 14 | 50 mfd. |
| capacitor 44 | 100 mfd. |
| capacitor 54 | 20700 mfd. |
| capacitor 81 | 910 picofarad |
| capacitor 122 | 1 mfd. |
| resistor 42 | 100 ohms |
| resistor 64 | 470 ohms |
| resistor 35 | 4.7K ohms |
| resistor 84 | 680 ohms |
| resistor 90 | 47 ohms |
| resistor 93 | 2.2K ohms |
| resistor 120 | 4.7K ohms |
| resistor 124 | 4.7K ohms |
| transformer 95 | Ferroxcube Core No. 758P188-3#ZA (3) wdg w/6 turns and wdg 112 w/17 turns |

With such components, the supply 100 is adapted to vary the shaped pulse 46 from a width of about 5.2 to 11.2 microseconds and to vary power switching frequency in the range from about 18 to 38 kilo Hertz with power output varying from about 30 to 85 watts while input voltage varies from 60 to 135 volts and while regulating output voltage in the range of 1 to 100 volts.

It should be understood that although particular embodiments of the power supplies provided by this invention have been described in detail above by way of illustrating the invention, this invention includes all modifications and equivalents thereof falling within the scope of the appended claims.

I claim:

1. In a switching power supply having power switching means for furnishing a series of shaped pulses to output means to provide an output voltage within a selected range, voltage controlled oscillator means are responsive to the output voltage for providing control pulses representative of the output voltage level, and means magnetically responsive to the control pulses are magnetically coupled to the power switching means for driving the switching means to regulate the output voltage to be within said selected range, the magnetic means comprising saturable transformer means having first winding means and having other winding means magnetically coupled to the first winding means, the first winding means being responsive to the control pulses to provide corresponding driving pulses in the other winding means for driving the switching means to regulate the output voltage to be within said selected range.

2. A switching power supply as set forth in claim 1 wherein said power switching means includes a power switching transistor having base and emitter means, said saturable transformer means is arranged to be driven to saturation and to recover in response to each of said control pulses, said other windings are connected to said base and emitter means to forward bias and render the power transistor conductive while the transformer means is being driven to saturation and thereafter to reverse bias and render the power transistor rapidly nonconductive while the saturable transformer means recovers from saturation, thereby to vary the frequency of shaped pulses provided by the power switching transistor while regulating that output voltage to be within said selected range.

3. A switching power supply as set forth in claim 2 wherein said other winding means include second and third winding means connected to the base and emitter means respectively of the power switching transistor providing positive feedback from the third to the second winding means to latch the transistor conductive with proportional drive of the base means while the transformer is being driven to saturation.

4. A switching power supply as set forth in claim 3 wherein said other winding means further include fourth winding means magnetically coupled to said first winding means, said fourth winding means being arranged to modify the base drive in accordance with variations in said oscillator frequency within a selected range to adjust the width of the shaped pulses provided by the power switching transistor for further regulating said output voltage to be within said selected range.

5. A switching power supply comprising input rectifying and filter means for receiving input from an a.c. power source to provide a d.c. input, a power switching transistor operable to modify the d.c. input for furnishing a series of shaped pulses, load transformer means modulating the shaped pulses to adjust the voltage level thereof, output rectifying and filter means responsive to the adjusted shaped pulses for providing an output voltage, control means responsive to the output voltage to provide control signals representative of the output voltage level, and means driving the power switching transistor in response to said control signals to regulate the output voltage to be within a selected range, characterized in that, the control means comprise voltage controlled oscillator means responsive to the output voltage for providing a series of control pulses at a frequency representative of the output voltage level, and the driving means include saturable transformer means having first winding means and having other winding means magnetically coupled to the first winding means, the first winding means being responsive to the control pulses to provide driving pulses in the other winding means to drive the power switching transistor at a corresponding frequency for regulating said output voltage to be within said selected range.

6. A switching power supply as set forth in claim 5 wherein said control means include means establishing a reference voltage, means providing an auxilary voltage, a control transistor in series with said first winding means and said auxilary voltage source, and means comparing said outlet voltage level to the reference voltage to apply an error signal to the voltage controlled oscillator such that increase in the error signal produces increase in oscillator pulse frequency and decrease in the error signal produces decrease in oscillator pulse frequency, the oscillator pulses being applied to the control transistor for rendering the control transistor conductive to apply said control pulses to the first winding means.

7. A switching power supply as set forth in claim 5 wherein said power switching transistor has base and emitter means, the saturable transformer means is arranged to be driven to saturation and to recover in response to each of said control pulses, and said other winding means are connected to said base and emitter means to forward bias and render the power switching transistor conductive while the saturable transformer means is being driven to saturation and thereafter to reverse bias and render the power switching transistor rapidly non-conductive while the saturable transformer recovers, thereby to vary the frequency of the shaped pulses provided by the power switching transistor for regulating said output voltage to be within said selected range.

8. A switching power supply as set forth in claim 7 wherein said other winding means include second and third winding means connected to the base and emitter means respectively of the power switching transistor providing positive feedback from the third to the second winding means to latch the transistor conductive with proportional driving of the base means while the transformer is being driven to saturation.

9. A switching power supply as set forth in claim 8 wherein voltage applied to said second winding means is clamped to a selected level for cooperating with said saturable transformer in determining the width of the shaped pulses provided by the power switching transistor.

10. A switching power supply as set forth in claim 9 having means varying said clamped voltage within a selected range in response to selected variation in said switching frequency of said power switching transistor for varying the width of said shaped pulses to cooperate with variation in the frequency of said shaped pulses in regulating said output voltage to be within said selected range.

11. A switching power supply as set forth in claim 10 wherein said other winding means further include fourth winding means magnetically coupled to said first winding means to be pulsed with said first winding means, and wherein additional means respond to variation in the frequency of the pulsing of the fourth winding means for varying said clamped voltage.

12. A switching power supply comprising power switching means for furnishing a series of shaped pulses to output means to provide an output voltage oscillator means responsive to the output voltage for providing control pulses representative of the output voltage level, and saturable transformer means having first winding means and having other winding means magnetically coupled to the first winding means, the first winding means being responsive to the control pulses to provide corresponding driving pulses in the other winding means for driving the switching means to regulate the output voltage to be within a selected range.

* * * * *